(No Model.)
L. A. STEIGER.
STRATIFIED BRICK.
No. 451,626.　　　　　　　　Patented May 5, 1891.
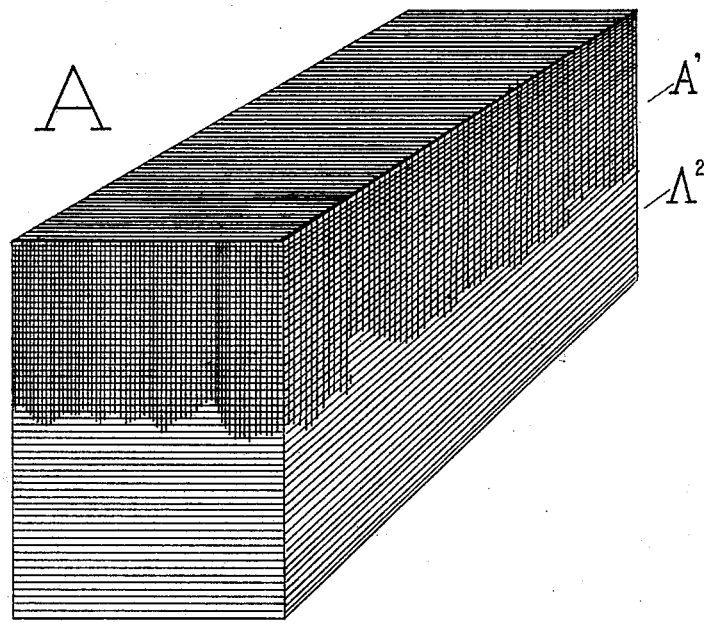
WITNESSES
Louis A. Steiger,
INVENTOR:
Attorneys.

UNITED STATES PATENT OFFICE.

LOUIS A. STEIGER, OF SAN JOSÉ, CALIFORNIA.

STRATIFIED BRICK.

SPECIFICATION forming part of Letters Patent No. 451,626, dated May 5, 1891.

Application filed September 18, 1890. Serial No. 365,409. (No model.)

*To all whom it may concern:*

Be it known that I, LOUIS A. STEIGER, a citizen of the United States, residing at San José, in the county of Santa Clara and State of California, have invented a certain new, useful, and valuable Improvement in Stratified Brick, of which the following is a full, clear, and exact description.

My invention has for its object to provide a stratified brick which can be used to advantage for paving, building, &c.

To this end my invention consists in forming the brick of two strata, one stratum being of bituminous rock and the other consisting of any suitable form of concrete.

The manner in which I carry out my invention may be more readily understood by referring to the accompanying drawing. In the figure, A represents my improved stratified brick.

In making my improved brick I prefer to proceed by first dissolving the natural bituminous rock by applying a sufficient amount of heat thereto. Then I mix my concrete, which is generally composed of sand, cement, and lime. Then I fill a mold, made of any desired shape, about half-full of the concrete, and then fill up the mold with the bituminous rock, after which I press the two together with great force. For this purpose I have used an ordinary brick-press; but my improved brick can best be made by employing a special machine which will press the two materials together with greater force than is employed in making ordinary brick. After being pressed and taken from the mold my brick appear as shown in the accompanying drawing, in which A' represents the concrete, and $A^2$ the stratum of bituminous rock, the two materials having been well blended together and rendered inseparable by the act of pressing.

The manner of making my stratified brick may be varied without avoiding the spirit of my invention.

My brick can be made in any desired shape; but for paving and general building purposes I prefer to make them of the shape shown in the accompanying drawing.

For paving purposes my brick possess many advantages. For instance, it is known that a paving-brick made wholly of bituminous rock will wear away or crumble at the bottom, owing to the action of the moist earth or foundation upon which it is laid, whereas by using my brick and laying it with the concrete side down such action is avoided. The stratum of concrete also serves to give body to the brick and prevents the more brittle stratum of bituminous rock from breaking or cracking.

Where my brick are used repairs can be made more readily than when the surface pavements are employed, as the latter require to be torn up, whereas my brick can be taken up and replaced without damaging the looks of the pavement in the least.

In surface pavements of any kind it is impossible to press the materials used therein together with sufficient force, whereas with my brick it is different, as by putting each brick under a tremendous pressure they are rendered extremely compact and strong.

For building purposes my brick also possess many advantages. It is known to every one that walls made of clay brick absorb an enormous amount of moisture, especially if they are not tarred on the outside. By using my brick for foundations and outside walls this serious trouble is avoided, as they are made of material which are far less absorbent than clay. By placing the concrete side of my brick outward a dark wall is obtained, and by placing the bituminous rock stratum outward a wall of light color is secured. A variegated effect may also be produced by arranging the dark and light sides of my brick outward alternately or by other arrangement thereof.

What I claim as new is—

A stratified brick composed of a stratum of bituminous rock and a stratum of concrete, the two materials being compressed together so as to form a solid body, substantially as shown and described.

In testimony whereof I affix my signature in presence of two witnesses.

LOUIS A. STEIGER.

Witnesses:
KARL KLEIN,
LOUIS P. KRAFFT.